(12) United States Patent
Davydycheva et al.

(10) Patent No.: US 8,200,437 B2
(45) Date of Patent: Jun. 12, 2012

(54) METHOD FOR BOREHOLE CORRECTION, FORMATION DIP AND AZIMUTH DETERMINATION AND RESISTIVITY DETERMINATION USING MULTIAXIAL INDUCTION MEASUREMENTS

(75) Inventors: Sofia Davydycheva, Sugar Land, TX (US); Dean Homan, Sugar Land, TX (US); Dzevat Omeragic, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 748 days.

(21) Appl. No.: 12/241,141

(22) Filed: Sep. 30, 2008

(65) Prior Publication Data

US 2010/0082255 A1    Apr. 1, 2010

(51) Int. Cl.
*G01V 3/18* (2006.01)
(52) U.S. Cl. .................................. 702/7; 702/6; 324/339
(58) Field of Classification Search ....... 702/7; 324/339
See application file for complete search history.

(56) References Cited

U.S. PATENT DOCUMENTS

| | | | |
|---|---|---|---|
| 5,041,975 A | 8/1991 | Minerbo et al. | |
| 6,556,015 B1 | 4/2003 | Omeragic et al. | |
| 6,574,562 B2 | 6/2003 | Tabarovsky et al. | |
| 6,969,994 B2 | 11/2005 | Minerbo et al. | |
| 7,143,521 B2 * | 12/2006 | Haugland | 33/304 |
| 2004/0100263 A1 * | 5/2004 | Fanini et al. | 324/339 |
| 2005/0256642 A1 * | 11/2005 | Barber et al. | 702/6 |
| 2006/0253255 A1 | 11/2006 | Omeragic et al. | |
| 2008/0033654 A1 * | 2/2008 | Bespalov et al. | 702/7 |
| 2009/0102485 A1 * | 4/2009 | Wang et al. | 324/333 |
| 2010/0198569 A1 * | 8/2010 | Wu et al. | 703/6 |

* cited by examiner

*Primary Examiner* — Jonathan C Teixeira Moffat
(74) *Attorney, Agent, or Firm* — Jeremy Berman; Darla P. Fonseca; Charlotte Rutherford (57) ABSTRACT

A method for determining electromagnetic induction properties of subsurface rock formations includes determining an eccentering angle of a well logging instrument disposed in a wellbore. The instrument includes at least one triaxial induction transmitter and at least one triaxial induction receiver. The eccentering angle is determined from symmetric cross component measurement differences. The triaxial induction measurements made from the at least one receiver are rotated to an apparent eccentering angle of zero. At least one electromagnetic induction property is determined from the rotated triaxial induction measurements.

10 Claims, 5 Drawing Sheets

*FIG. 6*

METHOD FOR BOREHOLE CORRECTION, FORMATION DIP AND AZIMUTH DETERMINATION AND RESISTIVITY DETERMINATION USING MULTIAXIAL INDUCTION MEASUREMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic induction well logging instruments and methods. More particularly, the invention relates to methods for correcting multiaxial induction measurements for effects of being eccentered in a wellbore, and for determining dip of rock formations and their resistivity in directions along and transverse to the bedding planes of such formations.

2. Background Art

Electromagnetic induction well logging has as a purpose the determination of electrical resistivity of rock formations. Electrical resistivity is related to parameters of interest of such formations, including fractional volume of pore space of the formation and the fluid content of the pore spaces. Generally, electromagnetic induction well logging includes moving an instrument along a wellbore drilled through rock formations. The instrument includes one or more transmitter antennas (typically in the form of wire coils) and one or more receiver antennas (also typically in the form of wire coils). Alternating current is passed through the transmitter(s) and signals are detected from the receiver(s) related to induced voltages. Characteristics of the induced voltages, for example, amplitude and phase with respect to the transmitter current, are related to the electrical resistivity of the rock formations. Typical induction logging instruments include a plurality of transmitters and receivers spaced apart from each other at selected distances along the length of the instrument so that characteristics of the rock formations may be investigated at a plurality of lateral distances ("depths of investigation") from the center of the wellbore.

Electromagnetic induction instruments and methods of interpreting the measurements made therefrom include a device used to provide services under the trademark RT SCANNER, which is a trademark of the assignee of the present invention.

The foregoing instrument includes a plurality of triaxial antennas. Each of the triaxial antennas has a wire coil arranged so that its magnetic dipole moment is along the longitudinal axis of the instrument, and two additional, substantially collocated wire coils arranged so that their dipole moments are substantially perpendicular to the axis of the instrument, and substantially perpendicular to each other. One of the triaxial antennas is used as the transmitter, and a plurality of triaxial coils used as receiver antennas are spaced along the instrument at selected longitudinal distances from the transmitter.

An important purpose for the foregoing induction well instrument is to be able to determine resistivity of rock formations both parallel to the direction of layers of the rock formation ("bedding planes") and in directions perpendicular to the bedding planes. It is known in the art that certain rock formations consist of a plurality of layers of porous, permeable rock interleaved with layers of substantially impermeable rock including substantial volume of clay minerals. Such formations, referred to as "laminated" formations, have been known to be productive of hydrocarbons and have quite different resistivity parallel to the bedding planes as contrasted with perpendicular to the bedding planes.

An important part of interpreting measurements from the foregoing instrument is to correct the measurements for the effects of the wellbore (which occupies some of the volume of investigation of the various receivers) and for the effects of formations having bedding planes disposed at angles other than perpendicular to the axis of the wellbore. Methods known in the art for determining resistivity of such formations using multiaxial electromagnetic induction measurements are described, for example, in U.S. Pat. No. 6,556,015 issued to Omeragic et al. and assigned to the assignee of the present invention, which describes systems and methods for determining subsurface formation properties using an antenna system disposed within a borehole traversing the formation. A logging system described in the foregoing patent includes a well tool implemented with an antenna system having transverse or tilted magnetic dipoles. One antenna implementation uses a set of three coils having non-parallel axes. Through mechanical or electromagnetic rotation of an antenna about its axis in order to maximize or minimize couplings, the systems and methods are used to estimate formation anisotropic resistivity, providing reduced borehole effects in vertical and small deviation wells.

Other techniques are described, for example, in U.S. Pat. No. 6,969,994 issued to Minerbo et al., also assigned to the assignee of the present invention. Methods described in the foregoing patent include disposing a logging instrument in a wellbore, in which the instrument includes a first transmitter antenna having its magnetic moment oriented in a first direction with respect to the instrument axis, a first receiver antenna having its magnetic moment oriented in said first direction with respect to the instrument axis, a second transmitter antenna having its magnetic moment oriented in a second direction with respect to the instrument axis, and a second receiver antenna having its magnetic moment oriented in said second direction with respect to the instrument axis. The method includes activating the first transmitter antenna to transmit electromagnetic energy, measuring a signal associated with the transmitted energy at the second receiver antenna, deactivating the first transmitter antenna; activating the second transmitter antenna to transmit electromagnetic energy, measuring a signal associated with the transmitted energy at the first receiver antenna and calculating the difference between the measured signals to determine a formation property.

There continues to be a need for improved interpretation techniques for multiaxial electromagnetic induction well logging measurements.

SUMMARY OF THE INVENTION

A method for determining electromagnetic induction properties of a subsurface rock formation according to one aspect of the invention includes determining an eccentering angle of a well logging instrument disposed in a wellbore. The instrument includes at least one triaxial induction transmitter and at least one triaxial induction receiver. The eccentering angle is determined from symmetric cross component measurement differences made by the at least one receiver. The triaxial induction measurements made from the at least one receiver are rotated to an apparent eccentering angle of zero. At least one electromagnetic induction property of the rock formation is determined from the rotated triaxial induction measurements.

A method for determining electromagnetic induction properties of a subsurface rock formation according to another aspect of the invention includes determining, from measurements made at each of a plurality of spaced apart triaxial induction receivers resulting from energizing a triaxial induction transmitter, an apparent eccentering angle of a well logging instrument from differences between symmetric cross component signals at each receiver. An apparent azimuth of the rock formations is determined using sums of symmetric cross component measurements from each receiver. The triaxial induction measurements made at each receiver are rotated to an apparent azimuth of zero. An apparent conductivity of the rock formation is determined at each receiver from the rotated triaxial induction measurements.

Other aspects and advantages of the invention will be apparent from the following description and the appended claims.

DETAILED DESCRIPTION

Figure 1:
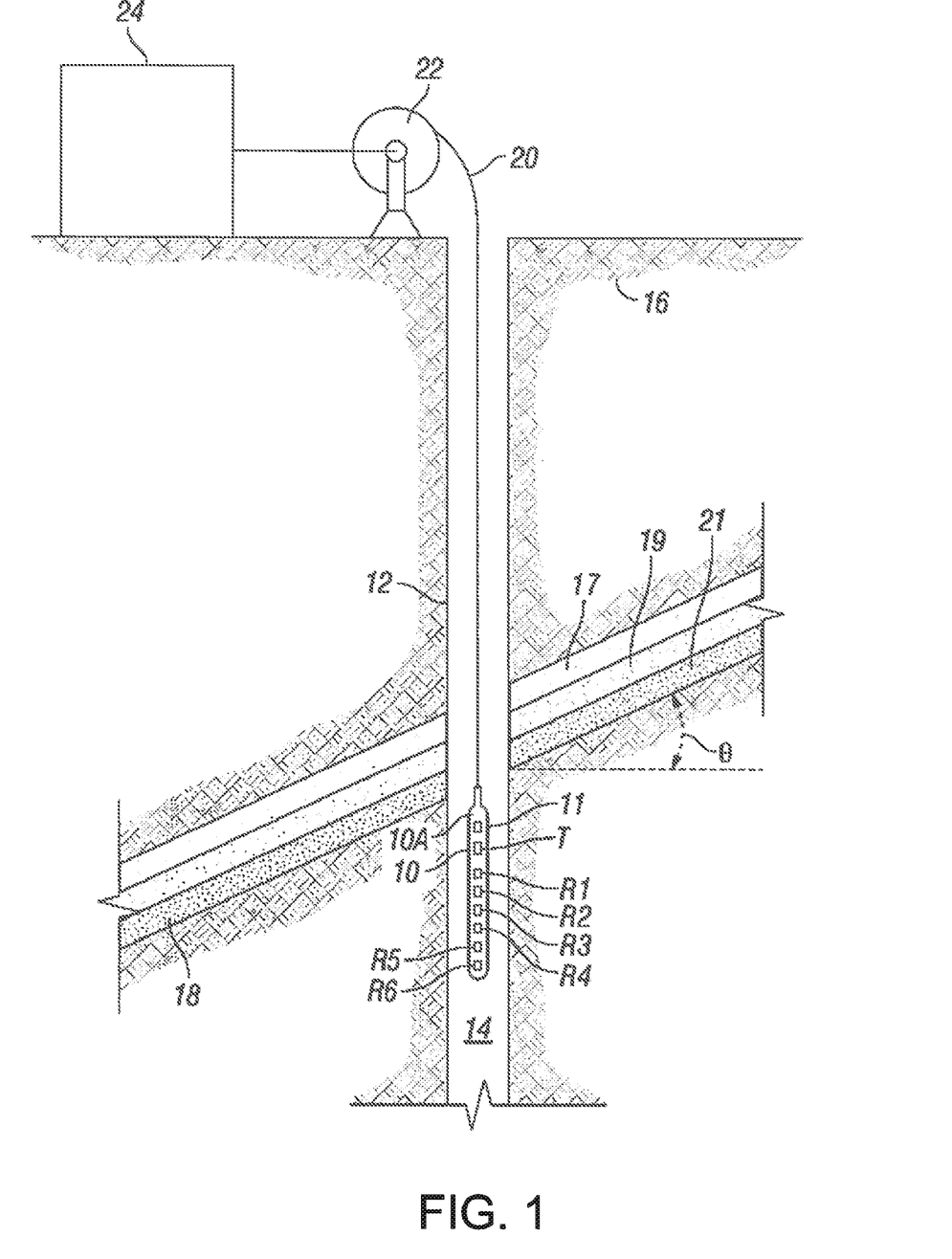
FIG. 1 shows an example of a multiaxial electromagnetic induction well logging instrument disposed in a wellbore drilled through laminated rock formations.

FIG. 1 shows an example of a multiaxial induction well logging instrument being used to acquire signals for processing according to various aspects of the present invention. The instrument 10 may be moved through a wellbore 12 drilled through subsurface rock formations 16, 18 at the end of an armored electrical cable 20. The cable 20 may be extended into the wellbore 12 and withdrawn from the wellbore 12 to move the instrument 10 using a winch 22 or similar spooling device known in the art. Power to operate the instrument may be provided by a recording unit 24 disposed at the surface and in electrical and/or optical communication with conductors (not shown separately) in the cable 20. Signals from the instrument 10 may be communicated to the recording unit 24 along the cable 20.

The instrument 10 may include a generally elongated housing 10A configured to move along the wellbore 12. In the present example, the instrument 10 may include a triaxial transmitter T and a plurality of spaced apart triaxial receivers R1 through R6 disposed at selected positions from the transmitter T. Details of the transmitter and receivers will be explained further below with reference to FIG. 2. While the present example includes one transmitter and six spaced apart receivers, the number of transmitters and receivers is not a limit on the scope of the present invention. The instrument 10 will typically includes circuitry, shown generally at 11, for conducting electrical current through the transmitter T and detecting voltages induced in the receivers R1 through R6. Signals corresponding to the detected voltages may be formatted for transmission to the recording unit 24 for recording and interpretation.

The wellbore 12 may be filled with liquid 14 called "drilling mud" used during the drilling of the wellbore 12. In some examples, the drilling mud 14 may have as its continuous phase an electrically non-conductive material such as oil. Other examples may have water as the continuous phase and are thus electrically conductive. As will be further explained below, various aspects of the invention are intended to correct measurements made by the instrument for the effects of the wellbore 12, which result from a combination of factors including, for example, the diameter of the wellbore 12, the electrical conductivity of the drilling mud 14 and the offset of the axis of the instrument 10 from the axis of the wellbore ("eccentering").

One of the rock formations shown at 18 may consist of a plurality of discrete layers, shown generally at 17, 19 and 21. The layers 17, 19, 21 may have different electrical resistivity from each other, such that apparent electrical resistivity of the formation 18 may be different when measured in a direction parallel to the lateral extent of the layers 17, 19, 21 ("along the bedding planes") than when measured perpendicular to the bedding planes. As shown in FIG. 1, it is also the case that the bedding planes of the formation 18 will intersect the wellbore 12 other than perpendicularly. Methods according to various aspects of the invention are intended to resolve the electrical resistivity of the formation 18 both along and perpendicular to the bedding planes substantially irrespective of the angle of intersection and the geodetic direction of the bedding planes when they are not horizontal.

Although the wellbore 12 is shown in FIG. 1 as being approximately vertical, as is known in the art, wellbores are commonly drilled along trajectories that include non-vertical or even horizontal portions. The angle of intersection of the bedding planes of the formation, which may be referred to as "dip", is indicated by $\theta$. The angle of intersection is a result of a combination of the inclination of the wellbore 12 from vertical and the geodetic attitude ("dip") of the formation 18.

Figure 2:
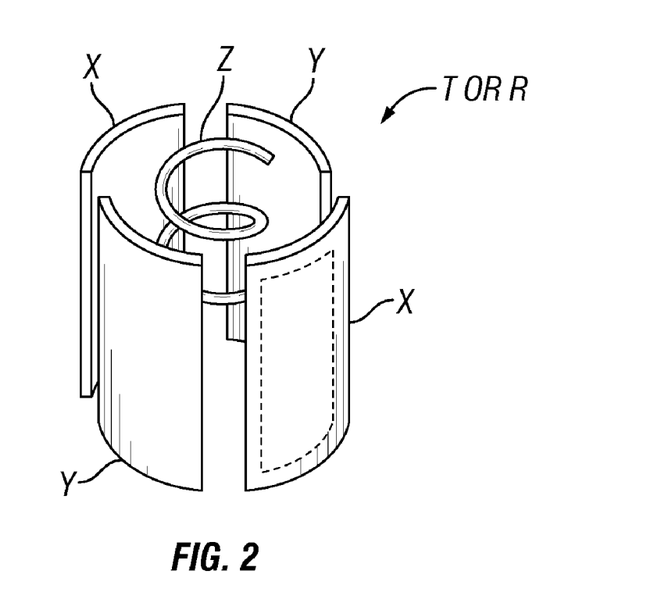
FIG. 2 shows an example of a triaxial induction coil that may be used in various examples of a well logging instrument as in FIG. 1.

FIG. 2 shows an example of a triaxial coil that may be used for one or more of the transmitter (T in FIG. 1) or receivers (RI through R6 in FIG. 1). The coil may include two "saddle" type coils arranged to conform approximately to the shape of the instrument housing (10A in FIG. 1). The saddle type coils may enclose areas on opposite sides of the housing (10A in FIG. 1) so as to have dipole moment oriented substantially perpendicular to the axis of the instrument (10 in FIG. 1) and substantially perpendicular to each other. Two such enclosed areas are shown respectively at X and Y in FIG. 2. The triaxial coil may also include a solenoid type coil, shown at Z that has dipole moment substantially coaxial with the axis of the instrument. The coil arrangement shown in FIG. 2 provides magnetic dipoles along each of three mutually orthogonal axes having a common midpoint therebetween.

For purposes of explaining the invention, the various measurements made by each of the receivers may be identified by the particular one of the coils that was energized at the transmitter and the particular one of the coils at each receiver for which a corresponding voltage is detected. Thus, for each receiver, there are nine component measurements: a detected voltage for each of the X, Y and Z receiver coils corresponding to energizing of each of the X, Y and Z transmitter coils. In the explanation below, each component measurement will be identified by a letter pair corresponding to the particular transmitter coil and the particular receiver coil. The nine component measurements are thus identifiable by the references XX, XY, XZ, YX, YY, YZ, ZX, ZY, ZZ. Component measurements that use the same transmitter and receiver dipole moment directions, i.e., XX, YY, ZZ are typically referred to as "direct coupled" component measurements. Component measurements that use a different transmitter dipole moment than the one used for the receiver, e.g., XY, XZ, YX, YZ, ZX, ZY, are typically referred to as "cross component" or "cross coupled" measurements.

Figure 3:
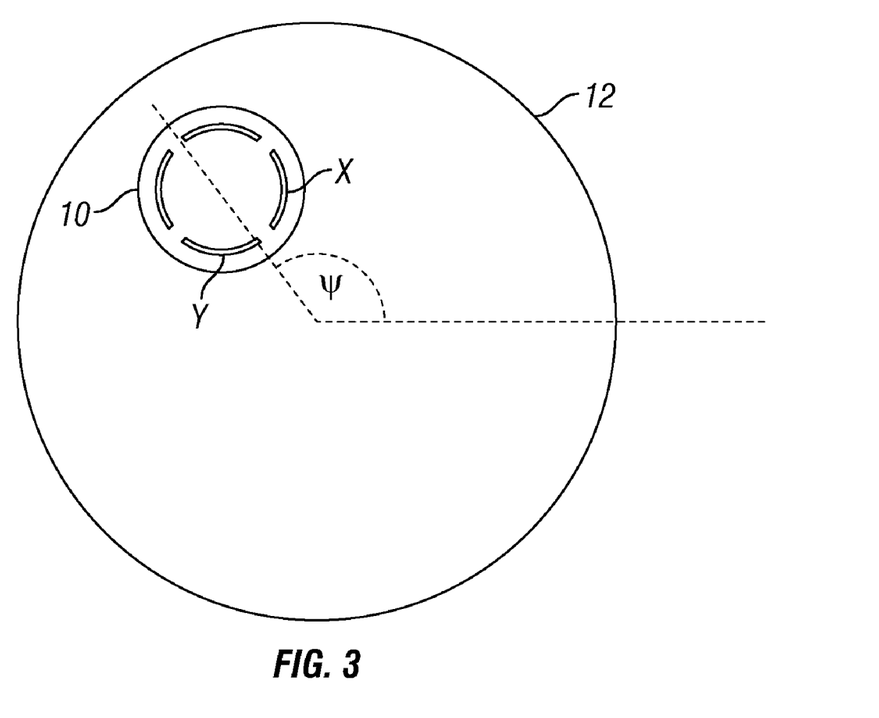
FIG. 3 shows the example instrument of FIG. 1 disposed eccentered in a wellbore to illustrate correcting induction measurements for wellbore effect.

FIG. 3 shows a cross section through part of the instrument to illustrate a particular angle that may be computed or used in various aspects of the invention. The instrument may be disposed in the wellbore 12 eccentered as explained above. Effects of the wellbore 12 on the response of the various receivers may be related to the eccentering angle, indicated by $\psi$, which may be defined as the angle subtended between an instrument reference, for example, the dipole moment direction of the X saddle coils and the direction of maximum distance from the instrument 10 to the wall of the wellbore.

Methods according to the various aspects of the invention are based on the observations that: (i) a symmetric matrix of the component measurements including the sums of corresponding but opposite cross-component measurements is substantially insensitive to the instrument being eccentered in the wellbore; and (ii) a symmetric matrix of the component measurements including the differences between corresponding but opposite cross-component measurements is substantially insensitive to resistivity anisotropy, that is, the azimuth and dip of the formation with respect to the instrument orientation. "Cross-component" measurements, as explained above, may be defined as using one transmitter dipole component (e.g., X, Y or Z) to impart an electromagnetic field into wellbore and the surrounding formations, and a different component to detect voltages caused by electromagnetic induction phenomena in the wellbore and the surrounding formations. The example methods explained below are applicable to signals from individual receivers (RI through R6 in FIG. 1).

In the following description certain terminology may be used for convenience. The difference between corresponding transmitter and receiver components may be referred to as "symmetrized measurements." See, for example, Minerbo, Omeragic and Rosthal, U.S. Pat. No. 6,969,994 and assigned to the assignee of the present invention.

The sum of opposed cross-dipole signals $T_{ij}+T_{ji}$ (e.g., [XZ+ZX], [YZ+ZY] and [XY+YX]) may be referred to as "anti-symmetrized measurements." See, for example, U.S. Patent Application Publication No. 2006/0253255 filed by Omeragic, Minerbo and Rosthal. The symmetrized measurements have relatively small sensitivity to dip and resistivity anisotropy, and larger sensitivity to formation layer boundaries and borehole eccentering. The anti-symmetrized measurements are sensitive to formation anisotropy but have relatively small sensitivity to borehole eccentering.

The disclosed borehole correction method is based on assumption that the borehole response and the formation responses can be separated from the measurements, and that the response for any formation anisotropy dip θ, formation anisotropy azimuth and borehole eccentering angle $\psi$, can expressed in terms of a centralized tool response and correction factors accounting for eccentering angle and the residual d, representing what is left after separation of anisotropy and eccentering effect.

$$\sigma_{app}(\theta,\phi,\psi)=\sigma_{app}(\theta,\phi)|_{centralized}+R_\psi(\sigma_{app}(\theta,\phi,\psi=0)-\sigma_{app}(\theta,\phi)|_{centralized})R_\psi^T+\delta(\theta,\phi,\psi)$$

where the centralized response can be calculated using standard tensor rotation:

$$\sigma_{app}(\theta,\phi)|_{centralized}=R_\phi(\sigma_{app}(\theta,0)|_{centralized})R_\phi^T$$

The dependence of the measurement responses on eccentering angle has the following functional form:

$\sigma_{app} \sim A+B \cos(2\psi)$, for the XX, YY, ZZ and (XZ+ZX) component measurements; and $\sigma_{app} \sim C \sin(2\psi)$, for the (XY+YX) and (YZ+ZY) component measurements.

It should be noted that for drilling fluid having water as the continuous phase (and therefore being electrically conductive), for high apparent dip and for large diameter boreholes, the angular dependence of the foregoing measurements is much stronger. For drilling fluid having oil and the continuous phase ("oil-based mud") and at low relative dip angles the angular dependence is relatively weak and can be ignored.

The residual term 6 for the symmetrized measurements (e.g., [XZ−ZX],[YZ−YZ], [XY−YX] component measurements) has the following form:

$$\epsilon(\theta, \phi, \psi)=A(\theta)\sin(\psi-\phi)$$

For the anti-symmetrized measurements, the residual term has the form:

$\delta(\theta, \phi, \psi) \sim A+B \cos(2\psi)+C \cos(\psi)$, for the (XZ+ZX) component measurement; and $\delta(\theta, \phi, \psi) \sim D \sin(2\psi)+E \sin(\psi)$, for the (YZ+ZY) component measurement.

The residual term for the anti-symmetrized measurements is important in water-based mud, and cannot be ignored as for the oil-based mud. The foregoing fact defines the differences in borehole correction strategies for oil based mud and water based mud and the algorithms used to implement the method.

To properly approximate tool responses, data bases (tables) can be built using accurate three dimensional instrument response modeling. See, for example, U.S. Pat. No. 5,041,975 issued to Minerbo and Mies and assigned to the assignee of the present invention for an example of such response modeling. The table resulting from such modeling is typically eight-dimensional (e.g., formation resistivity anisotropy parameters [i.e., vertical and horizontal resistivity, Rh, Rv, formation dip, θ, formation azimuth,]; borehole parameters [mud resistivity, $R_{mud}$, borehole size, eccentering position, $d_{ecc}$ and eccentering angle, $\psi$]). Knowledge of the instrument response properties allows construction of an efficient approximation scheme.

In low angle wells, the eccentering effect is not a strong function of formation anisotropy dip, so in practical implementations the dip can be ignored and the eccentering effect can be corrected using a fast analytical method. Such fast analytical eccentering correction method can also be used for higher apparent dip angles for an initial estimation. At higher dip angles, in oil based mud, using one eccentricity angle $\psi$ is sufficient. At high dip angles, and especially in larger diameter boreholes, for oil-based mud, the instrument response can be modeled using only two eccentricity angles to construct the response table, using one or two radial instrument positions within such wellbore. For water-based mud, unless the formation dip is relatively low, it is necessary to model the response for three eccentricity angles to have a sufficiently well populated table.

Figure 4:
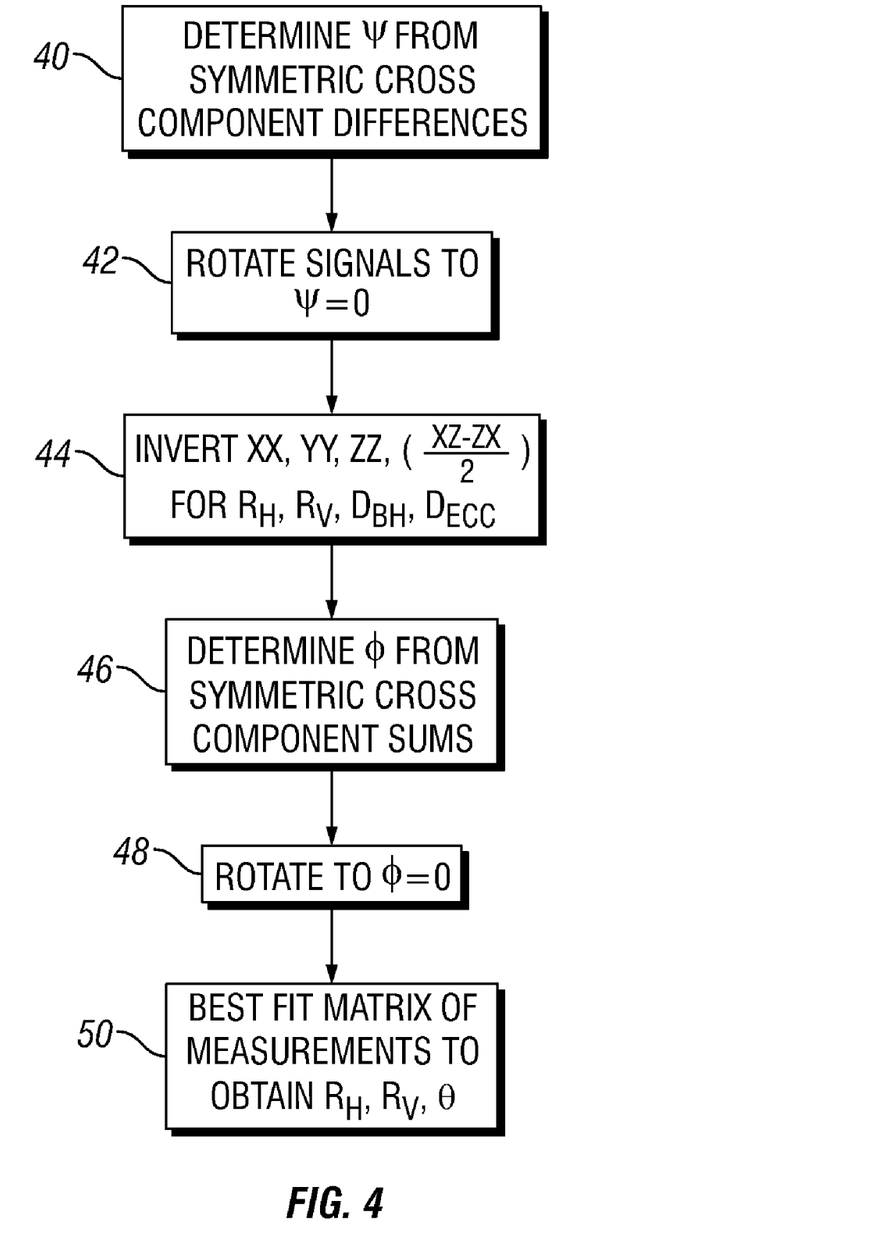
FIG. 4 is a flow chart of one example implementation of a method for signal processing.

In a first example of a method according to the invention, and referring to the flow chart in FIG. 4, the eccentricity angle $\psi$ may be determined from symmetrized cross-component signals by the expression:

$$\psi=\text{arctg}((YZ-ZY)/(XZ-ZX)) \quad (1)$$

The foregoing is shown at 40 in FIG. 4. After determining the eccentricity angle, each of the nine measured signals at may be mathematically rotated to provide the signals that would have been measured if the eccentricity angle were equal to zero (eccentricity aligned with, e.g., the X dipole moment direction). Such may be referred to as "rotated signals." The foregoing is shown at 42 in FIG. 4.

Certain of the rotated signals may then be inverted (XX, YY, ZZ, (XZ−ZX)/2)) with respect to the formation resistivity along the bedding planes ("horizontal resistivity" —$R_h$), the formation resistivity perpendicular to the bedding planes ("vertical resistivity"—$R_v$), the wellbore diameter $d_{bh}$ (if not known beforehand such as by caliper measurements) and the eccentricity value $d_{ecc}$. Note that because the cross component difference signals are used, any signal dependence on the formation anisotropy is relatively small and its effects on the inversion results may be ignored. The foregoing inversion is shown at 44 in FIG. 4.

The angular orientation of the formation (e.g., 18 in FIG. 1) with respect to an instrument reference, e.g., the X component dipole, referred to as the "azimuth", may be computed using anti-symmetrized cross component measurements as shown in the following expression:

$$=\text{arctg}((YZ+ZY)/(XZ+ZX)) \quad (2)$$

The foregoing is shown in FIG. 4 at 46. The nine component measurements may then be mathematically rotated by the formation azimuth angle determined as explained above. A result of the rotation is the measurements that would have been made if the formation azimuth were aligned with the instrument reference (e.g., the X component dipole direction). The foregoing is shown in FIG. 4 at 48.

A least squares or similar curve fitting technique may then be used to find the best fit of the rotated, matrix of measurements (XX, (XY+YX)/2, (XZ+ZX)/2; (XY+YX)/2, YY, (YZ+ZY)/2; (XZ+ZX)/2, (YZ+ZY)/2, ZZ) and then compute the formation resistivities $R_h$, $R_v$ and the dip angle θ. The foregoing is shown in FIG. 4 at 50.

The best fit search can be initiated using the values of $R_h$, $R_v$, $d_{ecc}$ and $d_{bh}$ estimated by the inversion performed using the eccentricity angle determined from equation (1). In the best fit calculation, dependence on the eccentricity angle is minimized because anti-symmetric cross component signal sums (e.g., XZ+ZX, YZ+ZY) are used. Note that even if there is some error in the eccentricity angle, such error does not substantially affect the computed anisotropic resistivities and dip because the summed, opposite cross-component measurements used above are not highly sensitive to the eccentricity angle. As a result, the eccentricity angle may be reasonably excluded from the best fit procedure. Note that $d_{ecc}$, determined in the first inversion, can be excluded or included in the best fit procedure.

Figure 5:
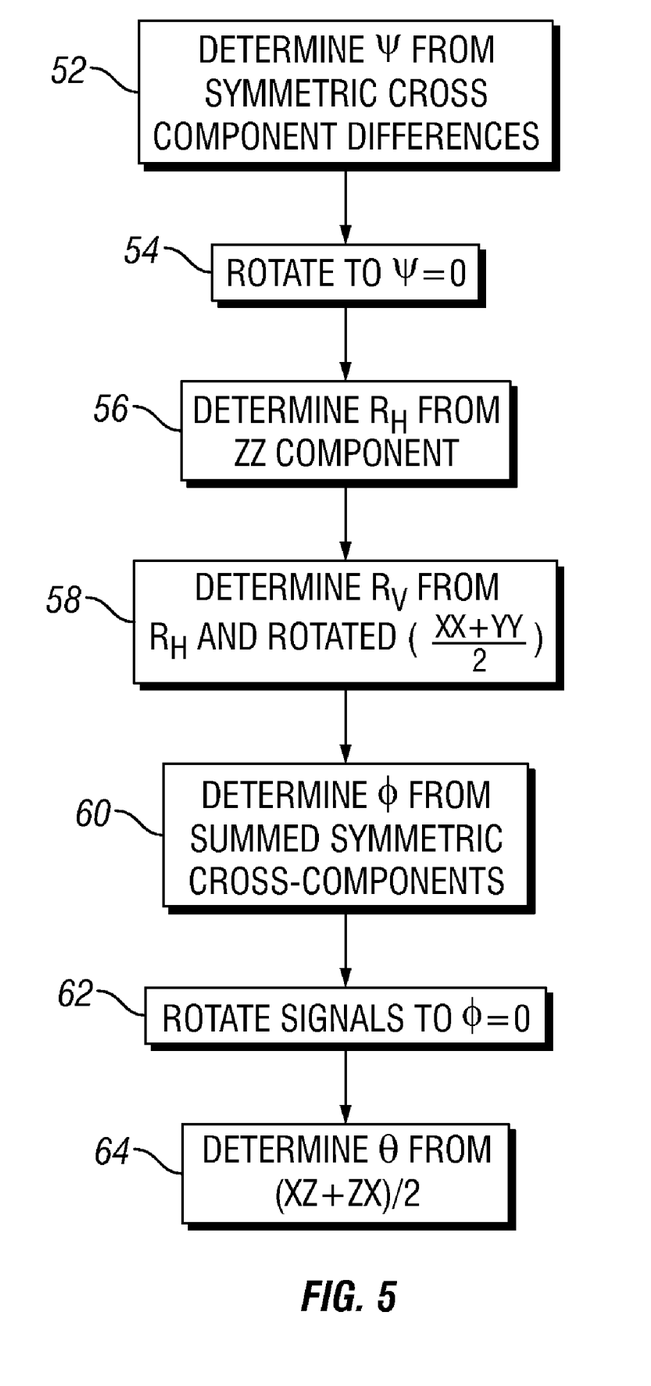
FIG. 5 is a flow chart of another example implementation of a method for signal processing.

In some cases it may be reasonably known beforehand that the dip angle will be relatively low. In such cases, a simpler procedure may be used. An example of such a simpler procedure includes the following as described with reference to FIG. 5. First is to determine the eccentricity angle in a manner similar to equation (1), using symmetrized cross component measurements as in the following expression:

$$\psi=\text{arctg}((YZ-ZY)/(XZ-ZX)) \quad (3)$$

The foregoing is shown at 52 in FIG. 5. Next, the component measurements are rotated by the eccentricity angle ψ, as in the previous example, so that the eccentricity angle is zero. The foregoing is shown at 54 in FIG. 5. After rotation of the component measurements, the ZZ component measurement may be used determine horizontal resistivity $R_h$ (if the wellbore diameter $d_{bh}$ is known or determinable). The foregoing is shown at 56 in FIG. 5. The rotated component anti-symmetrized measurement (XX+YY)/2 may then be used to obtain vertical resistivity $R_v$ using the previously determined $R_h$ and $d_{bh}$. The foregoing is shown at 58 in FIG. 5.

The formation azimuth as may be determined using the following expression $$=\text{arctg}((YZ+ZY)/(XZ+ZX)) \quad (4)$$

The foregoing is shown at 60 in FIG. 5. The component measurements may be rotated, at 62 in FIG. 5, by the formation azimuth angle determined using equation (4). Rotated anti-symmetric cross coupling (XZ+ZX)/2 may then be used to determine the dip θ, using the previously determined $R_h$ and $R_v$, and the wellbore diameter $d_{bh}$. The foregoing is shown at 64 in FIG. 5.

Figure 6:
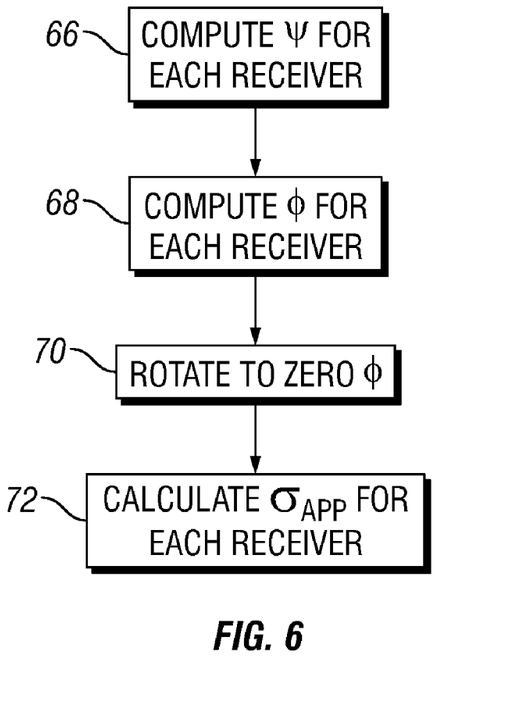
FIG. 6 is a flow chart of another example implementation of a method for signal processing.

In another aspect of the invention, a simple interpretation and quality check of data produced by the instrument can be performed. Instead of using the raw component measurements (i.e., XX, XY, . . . ZZ), in the present example, for each measurement sonde comprising one or more receiver systems (R1 through R6 in FIG. 1), it is possible to calculate and compare two angles and four apparent conductivity values:

Referring to FIG. 6, for each receiver, an eccentricity angle ψ can be calculated using component measurements according to the following expression:

$$\psi=\text{arctg}((YZ-ZY)/(XZ-ZX))$$

The foregoing is shown at 66 in FIG. 6. At 68, for each receiver, a formation azimuth angle can be calculated using the expression:

$$=\text{arctg}((YZ+ZY)/(XZ+ZX))$$

The XX, YY, ZZ, and (XZ+ZX)/2 component signals, after symmetrization and rotation, at 70 in FIG. 6, to zero azimuth may each be used to calculate apparent conductivity as shown at 72 in FIG. 6. A possible advantage of the foregoing technique is that the signal output channels are less noisy than the raw component measurements and offer clear indication of formation boundary positions, and anisotropy presence in cross-bedding (dipping anisotropic beds). The ZZ component measurement is primarily sensitive to horizontal resistivity ($R_h$); the XX and YY component measurements are primarily sensitive to anisotropy (in the low frequency limit they are proportional to $1/R_v$). The component (XZ+ZX)/2 is primarily sensitive to resistivity anisotropy (the ratio $R_v/R_h$) and dip.

It is possible to devise a simple technique relying on use of the foregoing measurements, either separately in a sequence, or together in an inversion procedure to determine $R_h$, $R_v$ and dip in the middle of layers, after formation boundaries are identified from polarization "horns" that appear in the XX and YY component measurements proximate layer boundaries. The symmetrized measurement (XY−YX) can be used to estimate the difference between the tool eccentricity angle and the formation anisotropy azimuth (ψ−).

The various calculations of eccentricity angle, azimuth and dip described above are referenced to the well logging instrument transmitter and receiver system, wherein X and Y axes are orthogonal and in a plane transverse to the instrument's longitudinal axis, styled Z in the foregoing description. The azimuth and dip may be recalculated with respect to a geodetic reference frame, i.e., magnetic or geodetic North, and inclination with respect to vertical (Earth's gravity vector) by including, e.g., in the circuits (11 in FIG. 1) a directional sensing device (not shown separately) to measure the instrument orientation with respect to a geodetic reference frame. Such geodetic directional sensing devices are well known in the art.

The methods described herein have been validated for induction well logging instruments having triaxial antennas with common centers (collocated antennas). It is to be understood, however, that the methods described herein can be extended to instruments having non-collocated antennas. It should also be clearly understood that while the examples presented herein are related to conveyance of the well logging instrument using armored electrical cable, the type of conveyance of the instrument is not a limitation on the scope of the present invention. Any other conveyance known in the art, including, without limitation, slickline, tubing, coiled tubing, drill pipe and casing may be used in accordance with the present invention.

Methods according to various aspects of the invention provide simple computational techniques to determine vertical resistivity, horizontal resistivity and eccentering of a triaxial induction well logging instrument.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining electromagnetic induction properties of a subsurface rock formation, comprising:
   determining an eccentering angle of a well logging instrument disposed in a wellbore, the instrument including at least one triaxial induction transmitter and at least one triaxial induction receiver, using symmetric cross component measurement differences of the measurements made by the at least one receiver, via a processor coupled to the well logging instrument;
   rotating triaxial induction measurements made by the at least one receiver to an apparent eccentering angle of zero, via the processor;
   determining at least one electromagnetic induction property from the rotated triaxial induction measurements, via the processor, by modeling a response of the well logging instrument using a plurality of selected eccentering angles for non-conductive wellbore fluid and a plurality of selected eccentering angles for conductive wellbore fluid;
   determining a horizontal resistivity of the rock formations using direct coupled signal components along a direction parallel to an axis of the well logging instrument, via the processor; and
   determining a vertical resistivity of the rock formations using the determined horizontal resistivity and direct coupled signal components in two orthogonal directions transverse to the axis, via the processor.

2. The method of claim 1 further comprising inverting the rotated triaxial induction measurements with respect to at least one of vertical resistivity and horizontal resistivity, via the processor.

3. The method of claim 1 further comprising determining an apparent azimuth of the subsurface rock formations using symmetric cross component measurement sums, via the processor.

4. The method of claim 3 further comprising rotating the triaxial induction measurements to an apparent azimuth of zero and determining a best fit of the zero azimuth rotated measurements to values of vertical resistivity, horizontal resistivity and apparent dip of the rock formations, via the processor.

5. The method of claim 1 further comprising determining an apparent azimuth of the rock formations from sums of symmetric cross component signals, via the processor.

6. The method of claim 5 further comprising rotating the triaxial induction signals to an apparent azimuth of zero and determining an apparent dip of the rock formations from the triaxial induction signals, via the processor.

7. The method of claim 1 further comprising estimating a difference between an apparent azimuth of the subsurface rock formations and the eccentering angle using a difference between symmetric cross component measurements in a plane normal to a longitudinal axis of the well logging instrument, via the processor.

8. A method for determining electromagnetic induction properties of subsurface rock formations, comprising:
   determining, from measurements made at each of a plurality of spaced apart triaxial induction receivers resulting from energizing a triaxial induction transmitter, an apparent eccentering angle of a well logging instrument from differences between symmetric cross component signals at each receiver, via a processor coupled to each receiver;
   determining an apparent azimuth of the rock formations at using sums of symmetric cross component measurements at each receiver, via the processor;
   rotating the triaxial induction measurements at each receiver to an apparent azimuth of zero, via the processor;
   calculating an apparent conductivity of the rock formation at each receiver from the rotated triaxial induction measurements, via the processor; and
   determining at least one electromagnetic induction property from the rotated triaxial induction measurements, via the processor, by modeling a response of the well logging instrument using a plurality of selected eccentering angles for non-conductive wellbore fluid and a plurality of selected eccentering angles for conductive wellbore fluid.

9. The method of claim 8 further comprising estimating a difference between the apparent azimuth and an eccentering angle using a difference between symmetric cross component measurements in a plane normal to a longitudinal axis of the well logging instrument, via the processor.

10. A method for determining electromagnetic induction properties of a subsurface rock formation, comprising:
   determining an eccentering angle of a well logging instrument disposed in a wellbore, the instrument including at least one triaxial induction transmitter and at least one triaxial induction receiver, using symmetric cross component measurement differences of the measurements made by the at least one receiver, via a processor coupled to the well logging instrument;
   rotating triaxial induction measurements made by the at least one receiver to an apparent eccentering angle of zero, via the processor;
   determining at least one electromagnetic induction property from the rotated triaxial induction measurements, via the processor;
   wherein the determining at least one electromagnetic induction property comprises modeling a response of the well logging instrument using a plurality of selected eccentering angles for non-conductive wellbore fluid and a plurality of selected eccentering angles for conductive wellbore fluid, using the processor.

* * * * *